Patented Apr. 30, 1929.

1,711,391

UNITED STATES PATENT OFFICE.

OSKAR KNECHT, OF BINNINGEN, NEAR BASEL, SWITZERLAND, ASSIGNOR TO THE FIRM CHEMICAL WORKS FORMERLY SANDOZ, OF BASEL, SWITZERLAND.

MANUFACTURE OF AZODYESTUFFS FOR DYEING CELLULOSE ESTERS.

No Drawing. Original application filed December 23, 1925, Serial No. 77,380, and in Germany January 6, 1925. Divided and this application filed March 16, 1927. Serial No. 175,929.

This application is a division of application Ser. No. 77,380, filed December 23, 1925.

Dyestuffs suitable for dyeing cellulose esters, which are too difficultly soluble for practical application, have been employed, up to now, either in the form of their bisulphite compound as stated in the specifications of British Patent No. 204,280 (1923) or as N-alkyl-ω-sulphonic acids, according to the specifications of British Patents No. 197,809 (1923), No. 200,873 (1923) and No. 212,029 (1924). During the dyeing process the acid groups of these dyestuffs are split off by hydrolysis, under the influence of the elevated temperature of the dyebath and the colors thus formed are then absorbed by the cellulose ester fibres.

It has now been found that it is possible to transform insoluble or difficultly soluble azodyestuffs, containing neither sulphonic nor carboxylic groups and possessing a particular affinity for cellulose esters, into stable and soluble derivatives by introducing a radical of glycerine into the molecule of the dyestuffs in place of one or more hydrogen atoms of the aromatic nucleus. This can be performed by coupling diazoaryl-glycerine ethers, which possess neither sulphonic nor carboxylic groups, but which may possess any other substituents, with azo components containing neither carboxylic nor sulphonic groups.

The dyestuffs thus obtained, apart from their good solubility, are distinguished by a particular affinity for cellulose esters, so that by their aid, bright and uniform shades may be obtained, without having to employ temperatures, which would be injurious to the fibres. In those cases, where the dyestuffs contain diazotizable aminogroups, the direct shades may be diazotized on the fibre and coupled with suitable developers.

The dyestuffs obtained by the process as described above are entirely different from those referred to in the above mentioned patents; the dyeing with these last mentioned dyestuffs is only possible by the fact, that their acid groups, to which their solubility in water is due, are split off by hydrolysis during the dyeing process. In contradistinction to this, the glycerine radicals of the new dyestuffs are not split off during the dyeing process, so that uniform shades are obtained, owing to the good penetration of the colors.

The following examples illustrate the improved process.

Example 1.

22,8 kg. of glycerine-2-amino-4-nitrophenylether, melting point 114°, obtained by partial reduction of glycerine-2.4-dinitrophenyl-ether (B. B. 12, 766; Journ. of Chem. Soc. London, 119, 1035; Chemisches Centralblatt 1921, III, 1114) are dissolved in 100 kg. of water and 24 kg. of concentrated hydrochloric acid and diazotized at 0°-5° C. with 6,9 kg. of sodium nitrite. The clear solution of the diazocompound is run into a solution of 16 kg. of p-xylidine-hydrochloride in 200 kg. of water at 0° C.; coupling begins at once and the new dyestuff separates as an orange brown deposit which becomes soon gelatinous. After some time, a solution of caustic soda is carefully added, until Congopaper shows only a weak reaction, whereby the coupling is finished and the dyestuff becomes crystalline. After filtering and drying the latter appears as a brown violet powder and its hydrochloride is much easier soluble in water than the corresponding dyestuff obtained from nitroanisidine:

$OCH_3 : NH_2 : NO_2 = 1 : 2 : 4$ and p-xylidine.

For dyeing purposes, the solution of the hydrochloride is diluted with the necessary quantity of water, further additions being superfluous. In this bath, acetate silk is dyed in very uniform, golden yellow shades, and the dye bath is completely exhausted. The direct shade is transformed by diazotizing and developing with β-naphthol into a brilliant bluish red tone.

The dyestuff possesses most probably the following formula:

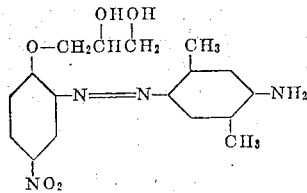

The dyestuff as developed on the fibre with

β-naphthol shows most probably the following formula.

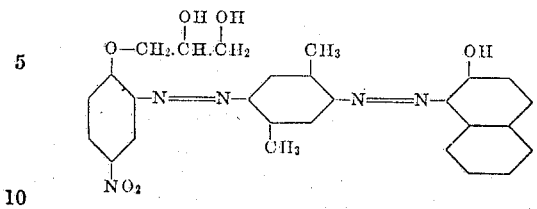

Example 2.

The dyestuff obtained according to Example 1 is filtered, stirred up with water and hydrochloric acid and diazotized with 6,9 kg. of sodium nitrite at 0° C. The diazocompound of the monoazodyestuff is then run into a solution of 12,5 kg. of metatoluylenediamine in 100 kg. of water and rendered alkaline with caustic soda. Coupling takes place at once, a black gelatinous mass being precipitated; this is diluted with a great amount of water, acidulated with acetic acid and then boiled up, whereby the gelatine is transformed into an easily filterable mass. The dried disazodyestuff forms a greenish black powder and its hydrochloride is easily soluble in water. Acetate silk is dyed in deep brownish red shades.

The dyestuff possesses most probably the following formula:

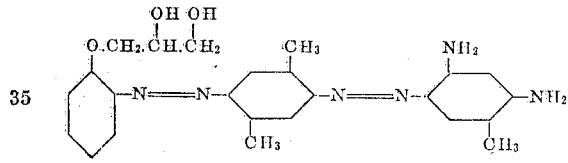

Example 3.

22 kg. of o-aminophenoxypropandiolhydrochloride (Bull. Soc. Chim. de France (4) 13, 525; Chem. Centralblatt II, 356) are dissolved in 100 litres of water and 12 kg. of concentrated hydrochloric acid and then diazotized with 6,9 kg. of sodium nitrite. An aqueous solution of 23 kg. of 1-amino-2-naphtholethyletherhydrochloride in 400 litres of water is run into the clear and colorless solution of the diazocompound and the acid neutralized with sodium acetate. Coupling takes place at once, a deep violet solution being formed, whereupon by the addition of about 10% of volume of common salt, the dyestuff can be precipitated to a greenish glossy somewhat resinous deposit. After having been stirred for some time, the mass becomes completely solid and can easily be filtered. The dyestuff, which is obtained after drying, is a dark red brown powder and dissolves very easily in hot water in the form of its hydrochloride. It dyes acetate silk in copper colored shades. By diazotizing and developing with β-naphthol, this shade changes into a reddish dark blue.

The dyestuff possesses most probably the following formula:

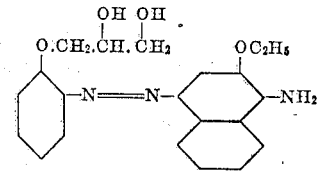

The dyestuff as developed on the fibre with β-naphthol possesses most probably the following formula:

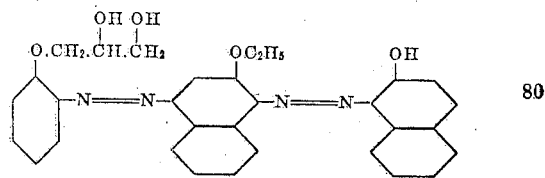

Example 4.

22 kg. of p-aminophenoxypropandiolhydrochloride or glycerine-4-aminophenylether-hydrochloride (loc. cit.) are diazotized with 6,9 kg. of sodium nitrite as indicated in Example 3. Into the clear solution of the diazo compound a solution of 18 kg. of α-naphthylamine-hydrochloride in 500 litres of water, which has been heated to about 60° C. is run and subsequently the temperature is kept at 5° C. by the addition of ice. Coupling is started by a very slow addition of sodium acetate. If the diazocompound has disappeared after 24 hours, the solution is acidulated with hydrochloric acid and raised to a temperature of 75° C. Upon salting out, the violet solution yields the dyestuff as a greenish golden resin, which after cooling is filtered and dried and forms a black powder of a bluish tone. Acetate silk is dyed in orange shades; by diazotizing and developing with β-naphthol a deep, brownish violet is obtained.

The dyestuff possesses most probably the following formula:

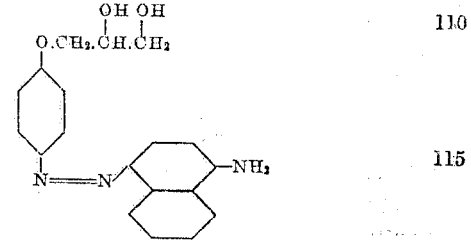

The dyestuff as developed on the fibre with β-naphthol possesses most probably the following formula:

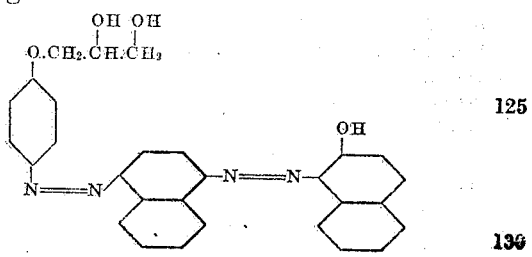

What I claim is:

1. A process for the preparation of azodyestuffs, containing neither carboxylic nor sulphonic groups, suitable for dyeing cellulose esters, consisting in coupling a diazo-compound having at least one hydrogen atom of its aromatic nucleus substituted by a radical of glycerine, with an azo component.

2. As new products of manufacture, the herein described azodyestuffs for dyeing cellulose esters, obtained in coupling a diazotized aminoarylglycerineether free from carboxylic and sulphonic groups with an azo-component also free from carboxylic and sulphonic groups, said dyestuffs being in the form of the hydrochloride easily soluble in water and when so dissolved dyeing cellulose esters of yellow to orange, red, brown, blue and violet tints, which when diazotized and developed are orange, red, brown, blue, violet and black.

In witness whereof I have hereunto signed my name this 3rd day of March, 1927.

OSKAR KNECHT.